United States Patent Office 2,853,362
Patented Sept. 23, 1958

2,853,362

PROCESS OF PRODUCING PERCHLORATES FROM CHLORATES

Daniel J. Jaszka, Buffalo, and Theodore H. Dexter, Niagara Falls, N. Y., assignors to Olin Mathieson Chemical Corporation, a corporation of Virginia No Drawing. Application January 16, 1953
Serial No. 331,738

2 Claims. (Cl. 23—85)

Our invention relates to improvements in the conversion of chlorates to perchlorates according to the general process utilizing lead dioxide and sulfuric acid.

In this general process, lead sulfate is formed as a by-product, and our invention also includes an advantageous procedure whereby the by-product lead sulfate can be economically and conveniently converted into lead dioxide for further use in the chlorate oxidation step.

It is known in the art to convert chlorates to perchlorates by the use of lead dioxide and sulfuric acid. The equation expressing the reaction when the chlorate is potassium chlorate is as follows:

$$PbO_2 + KClO_3 + H_2SO_4 = PbSO_4 + KClO_4 + H_2O$$

As the reaction has been performed according to the prior art, sulfuric acid of a strength of 52 percent by weight has been used and the reaction time has been undesirably long. We have discovered, however, that the reaction time can be significantly decreased, down to about 15 minutes, for example, by the use of sulfuric acid of higher concentration than has heretofore been used. Generally, we use sulfuric acid of a strength from 55 to 70 percent by weight.

When perchlorates are manufactured by the oxidation of chlorates using lead dioxide and sulfuric acid, it is essential from a commercial standpoint that economical means be provided for converting the lead sulfate formed back into lead dioxide. Various proposals have been made for doing this. One of those proposals involves the use of a combination of sodium hydroxide and chlorine, the second involves the use of potassium nitrate, and the third involves the use of calcium plumbite. None of these proposals is a satisfactory one, however, the one involving the use of a combination of sodium hydroxide and chlorine, for example, requiring the use of large excesses of sodium hydroxide and chlorine. In another aspect of our invention, we have discovered that lead sulfate can be converted to lead dioxide in a highly advantageous manner by reacting it with chlorine and a stoichiometric excess of sodium carbonate according to what we believe are the following reactions:

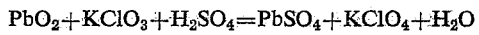
$$Na_2CO_3 + PbSO_4 = PbCO_3 + Na_2SO_4$$
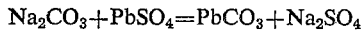
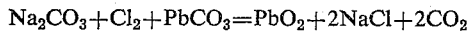
$$Na_2CO_3 + Cl_2 + PbCO_3 = PbO_2 + 2NaCl + 2CO_2$$

This reaction can be carried out by adding sodium carbonate to an aqueous slurry of lead sulfate in order to form lead carbonate, and thereafter introducing chlorine into the reaction mixture. Based upon the amounts of lead sulfate and chlorine used, the conversions encountered when our process is utilized are exceedingly high, being of the order of about 90 percent.

The following examples illustrate in detail the practice of our invention and are to be considered as not limitative. In the examples, the parts and percentages are by weight, unless otherwise specified.

*Example I*

59.8 parts of lead dioxide, 30.6 parts of potassium chlorate and 10 parts of water are intimately admixed at room temperature, after which 49 parts of 100 percent sulfuric acid and 16.5 parts of water are added. The reaction mixture is then heated at 100° C. for about 30 minutes and is then permitted to cool to room temperature. Lead sulfate and potassium perchlorate are present in the precipitate. The precipitate is then separated by means of filtration and is washed with cold water in order to remove sulfuric acid adhering thereto. Thereafter, the filtrate is discarded. The precipitate is then washed with boiling water, producing a filtrate containing the potassium perchlorate. Upon evaporating and cooling the filtrate, the potassium perchlorate product is formed as a precipitate. Practically a quantitive amount of lead sulfate remains on the filter.

In order to convert the lead sulfate back to lead dioxide, 85.7 parts of lead sulfate prepared as just described 66 parts of sodium carbonate and 200 parts of water are mixed in a reaction vessel at ordinary temperatures. The reaction commences and the temperature rises to about 45° C. at the end of one minute, about 95.5 percent of the lead sulfate being converted to lead carbonate. Then the reaction mixture is chlorinated by bubbling in 25 parts of gaseous chlorine over a period of about 25 minutes, the reaction temperature being maintained at about 80° C. This procedure results in the formation of a high yield of lead dioxide which can be separated from the reaction mixture by filtration and then used for the oxidation of further quantities of potassium chlorate.

*Example II*

195 parts of lead dioxide, 53.3 parts of sodium chlorate and 25 parts of water are intimately admixed at room temperature, after which 165 parts of 100 percent sulfuric acid and 50 parts of water are added. The reaction mixture is then heated over a period of about 40 minutes, the temperature rising to about 130° C. 94 percent of the sodium chlorate is thereby converted to sodium perchlorate. The mixture is then filtered hot and washed with hot water in order to remove lead sulfate. The combined filtrate and washings contain sulfuric acid and sodium perchlorate, and the latter can be precipitated from this filtrate by the use of a conventional evaporation and cooling step. Alternatively, if desired, perchloric acid can be recovered by a simple distillation of the filtrate. The lead sulfate is converted back to lead dioxide in accordance with the procedure described in Example I.

*Example III*

23.9 parts of lead dioxide, 12.3 parts of potassium chlorate and 5 parts of water are intimately admixed at room temperature, after which 19.6 parts of 100 percent sulfuric acid and 11 parts of water are added. The reaction mixture is then heated at 115° C. for a period of one hour, resulting in a conversion of 80 percent of the potassium chlorate to potassium perchlorate. On filtering the reaction mixture and cooling the filtrate, the potassium perchlorate is recovered therefrom and the lead sulfate is converted to lead dioxide in accordance with the procedure of Example I.

Various modifications can be made in the specific procedures of the examples to provide other embodiments which fall within the scope of our invention. The relative amounts of lead dioxide and chlorate used can be varied considerably, relative amounts which are stoichiometric preferably being used. The molar amount of sulfuric acid present in the reaction mixture is not critical, from about 1.5 or 2 to about 6 moles of sulfuric acid per mole of lead dioxide being preferred. For best results in the conversion of the chlorate to perchlorate, the sulfuric acid initially present in the reaction mixture should have a strength between 55 and 70 percent by weight. Also, the reaction temperature is not critical, the temperatures heretofore employed in the conversion of chlorates to perchlorates by means of lead dioxide and sulfuric acid being suitable. Thus, reaction temperatures of from about 90 to about 120° C., as well as higher and lower reaction temperatures, can be used. The specific examples illustrate the conversion of sodium chlorate and potassium chlorate to the corresponding perchlorates. Our invention is also applicable to the conversion of other alkali metal chlorates to their corresponding perchlorates, and also to the conversion of alkaline earth metal chlorates to their corresponding perchlorates, as in the conversion of calcium or magnesium chlorate to the corresponding perchlorate.

In the step of converting the lead sulfate into lead dioxide, it is essential during the chlorination that the pH of the reaction mixture be maintained above 7. As will be apparent to those skilled in the art this can be accomplished in various ways, for example, by reacting an excess of sodium carbonate with the lead sulfate in the step of forming the lead carbonate. For example, in accordance with this expedient, 2.2 moles of sodium carbonate per mole of lead sulfate can initially be used. On the other hand, in the step of forming the lead carbonate, stoichiometric quantities of sodium carbonate and lead sulfate can be used, additional sodium carbonate being added to the reaction mixture prior to the chlorination step to make sure that the reaction mixture remains alkaline during the chlorination. The amount of water present in the reaction slurry during the formation of the lead carbonate can be varied widely, as can the reaction temperature. In general, however, we use a reaction temperature of about 70 to about 90° C. in forming the carbonate. Also, in place of the sodium carbonate used there can be employed other alkali metal carbonates such as potassium carbonate.

We claim:

1. In a process for the production of potassium perchlorate by oxidizing potassium chlorate with lead dioxide and sulfuric acid, the steps of reacting potassium chlorate with lead dioxide and sulfuric acid of a strength of 55 to 70 percent by weight to form a precipitate consisting essentially of lead sulfate and potassium perchlorate, separating the precipitate, washing the precipitate with cold water to remove adhering sulfuric acid, thereafter washing the precipitate with hot water to form an aqueous solution containing potassium perchlorate, precipitating potassium perchlorate from such solution by cooling and evaporation, reacting the lead sulfate with chlorine and an excess of sodium carbonate to convert the lead sulfate to lead dioxide, separating the lead dioxide and then reacting it with further quantities of potassium chlorate to form additional potassium perchlorate.

2. In a process for the production of sodium perchlorate by oxidizing sodium chlorate with lead dioxide and sulfuric acid, the steps of reacting sodium chlorate with lead dioxide and sulfuric acid of a strength of 55 to 70 percent by weight to form a precipitate consisting essentially of lead sulfate, separating the precipitate by filtration, precipitating sodium perchlorate from the filtrate by cooling and evaporation, washing the lead sulfate with water to remove adhering sulfuric acid, reacting the lead sulfate with chlorine and an excess of sodium carbonate to convert the lead sulfate to lead dioxide, separating the lead dioxide and then reacting it with further quantities of sodium chlorate to form additional sodium perchlorate.

References Cited in the file of this patent

UNITED STATES PATENTS 788,631    Couleru _____ May 2, 1905

FOREIGN PATENTS 31,669    Germany _____ June 2, 1885

OTHER REFERENCES

Friderich et al.: Le Moniteur Scientifique, vol. 65, pp. 514–518 (1906).